(12) United States Patent
Nishi et al.

(10) Patent No.: US 6,726,539 B2
(45) Date of Patent: Apr. 27, 2004

(54) APPARATUS AND METHOD FOR POLISHING END-SURFACE OF FERRULE

(75) Inventors: Yasushi Nishi, Hadano (JP); Kazuhiro Nakada, Sagamihara (JP); Makoto Kobayashi, Hadano (JP)

(73) Assignee: Hitachi, Ltd., Tokyo (JP)

( * ) Notice: Subject to any disclaimer, the term of this patent is extended or adjusted under 35 U.S.C. 154(b) by 180 days.

(21) Appl. No.: 09/842,917

(22) Filed: Apr. 27, 2001

(65) Prior Publication Data

US 2002/0031986 A1 Mar. 14, 2002

(30) Foreign Application Priority Data

May 1, 2000 (JP) .......................... 2000-132080

(51) Int. Cl.[7] .............. B24B 1/00; B24B 7/19
(52) U.S. Cl. .............. 451/41; 451/271; 451/278; 451/42
(58) Field of Search .............. 451/41, 42, 256, 451/283, 285, 287

(56) References Cited

U.S. PATENT DOCUMENTS 6,077,154 A * 6/2000 Takashi et al.

* cited by examiner

*Primary Examiner*—Joseph J. Hail, III
*Assistant Examiner*—Daniel Shanley
(74) *Attorney, Agent, or Firm*—Antonelli, Terry, Stout & Kraus, LLP

(57) ABSTRACT

A ferrule end-surface polishing apparatus for polishing an end-surface of a ferrule for an optical fiber is provided. The apparatus includes a ferrule holder having a holder block capable of sandwiching a cylindrical portion of a ferrule, and a guide block for guiding the ferrule to the holder block; a polisher having a rotatable polishing board for polishing an axial end-surface of the ferrule held by the ferrule holder; and a ferrule transfer device for transferring and loading the ferrule into the ferrule holder, and for removing the ferrule therefrom after polishing. With this configuration, the ferrule polishing operation is automated.

10 Claims, 5 Drawing Sheets

APPARATUS AND METHOD FOR POLISHING END-SURFACE OF FERRULE

BACKGROUND OF THE INVENTION

The present invention relates to a ferrule end-surface polishing apparatus for polishing an end-surface of a ferrule for an optical fiber, and more particularly, to a ferrule end-surface polishing apparatus suitable for automated polishing of a ferrule end-surface.

In a conventional apparatus for polishing an end-surface of a ferrule for an optical fiber, for example, as described in JP-A-6-179161, an end portion of a ferrule is securely held by a holding means, and an end-surface of the ferrule is pressed onto an eccentrically rotating polishing platform at a constant pressure to polish the end-surface of the ferrule.

In the foregoing conventional apparatus, however, no consideration has been given to automatization which is essential to accommodate a significant increase in demand for optical fiber products in the future. The aforementioned known example discloses automation of polishing alone through the rotation of a polishing machine, and discloses that mounting and holding of ferrules, replacement of polishing paper, and so on are manually performed. For this reason, there has been a problem that the automatization is difficult. Specifically explaining, in the aforementioned conventional apparatus, a ferrule is mounted by inserting the ferrule into a hole slightly larger than the outer diameter of the ferrule (for example, approximately 0.005 mm), made in a ferrule holder, and holding the ferrule with fixing nuts at a fixed height and a fixed angle.

The replacement of polishing paper involves operations such as removing a ferrule holder with a ferrule mounted therein, and replacing polishing paper attached on a rotating disk. The insertion of a ferrule into a hole in the ferrule holder is difficult even with human's hands since even slight inclination would result in a chape. Its automatization would require a highly accurate positioning machine and a highly accurate sensor, but is practically not feasible. In addition, for the replacement of polishing paper, it is difficult, even with human's hands, to remove a metal-made holder, which is made thick for ensuring a rigidity, with a ferrule mounted therein, leading to a likelihood of breaking an optical fiber.

It is an object of the present invention to provide an apparatus for polishing an end-surface of a ferrule, which facilitates the automatization.

SUMMARY OF THE INVENTION

To achieve the above object, the present invention provides a ferrule end-surface polishing apparatus having holding means for holding a ferrule, and a turntable for rotating and holding polishing paper for polishing an end-surface of the ferrule held by the holding means, wherein the holding means comprises two holder blocks which are movable to each other and have holders formed at opposing portions thereof, and a guide block disposed above the holder blocks for guiding the ferrule moved down from above between the two block holders.

DETAILED DESCRIPTION OF THE PREFERRED EMBODIMENTS

Figure 1:
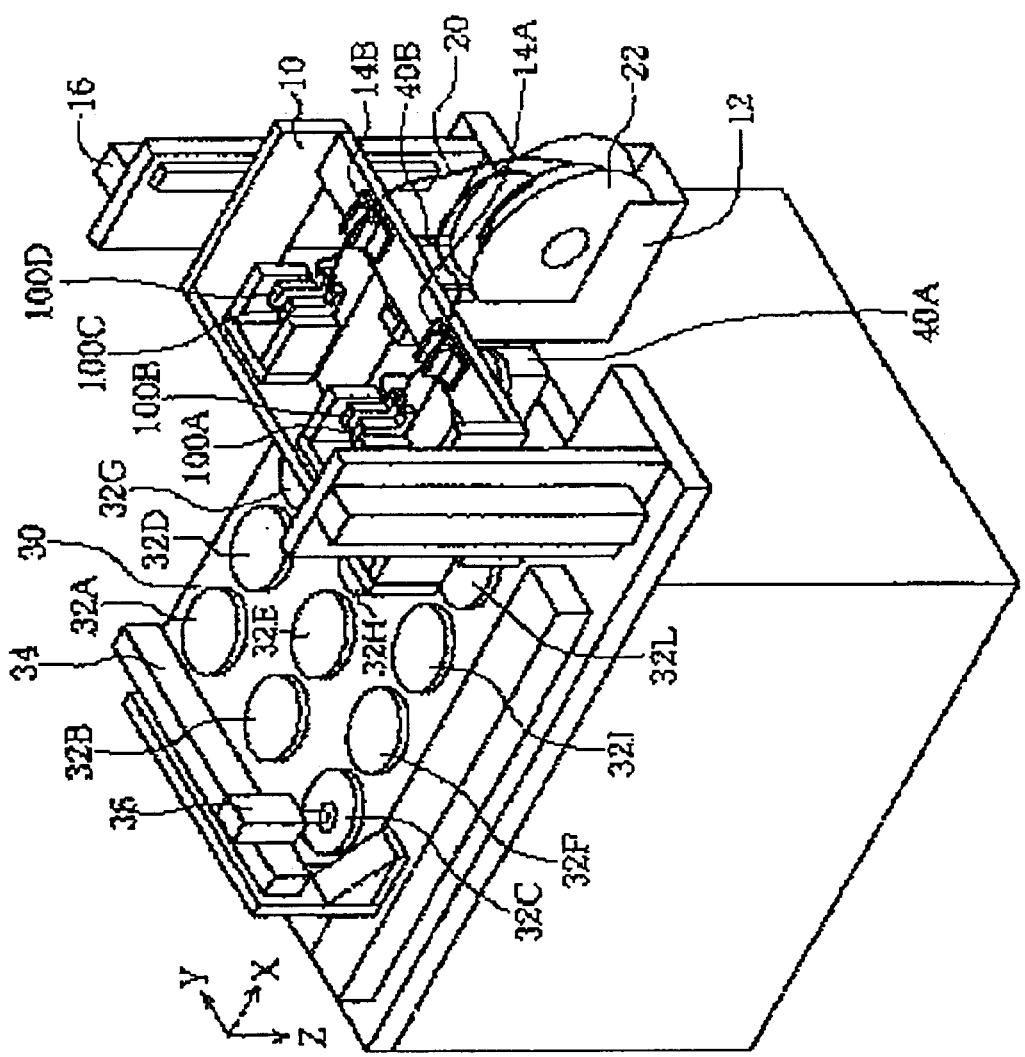
FIG. 1 is a perspective view illustrating the general configuration of the present invention.

FIG. 1 is a perspective view illustrating the general configuration of an apparatus for polishing an end-surface of a ferrule according to one embodiment of the present invention.

An optical fiber supporting unit 10 comprises a bobbin holder 12. In the bobbin holder 12, an optical cable 20 wound around a bobbin 22 is set by an optical fiber transfer robot or human's hands. Also, the optical cable supporting unit 10 comprises cable holders 14A, 14B. When the bobbin 22 is set in the bobbin holder 12 by an optical cable transfer robot or human's hands, both ends of the optical fiber 20 are set to the cable holders 14A, 14B, respectively. Here, the optical fiber 20, is of a double core type, in which two optical cables are included. Ferrules are attached to both leading ends of the optical cable, wherein the number of ferrules is four since this embodiment employs the double core type optical cable.

The optical cable supporting unit 10 comprises four ferrule positioning/holding units 100A, 100B, 100C, 100D. The ferrule positioning/holding units 100A, 100B, 100C, 100D are all identical in configuration, so that the detailed configuration thereof will be described below as a ferrule positioning/holding unit 100 using FIG. 2. The ferrule positioning/holding units 100 position and hold four ferrules at both ends of the optical cable 20 at respective predetermined positions. Also, the optical cable supporting unit 10 is movable in the vertical direction (Z direction) by a unit elevating mechanism 16.

A polishing paper setting unit 30 holds a plurality of sheets of polishing paper 32A, ..., 32L. In this example, assume that the sheets of polishing paper 32A, 32L include six sheets of coarse polishing paper 32A, ..., 32F and six sheets of fine polishing paper 32G, ..., 32L. Above the polishing paper setting unit 30, a polishing paper transfer robot 34 is disposed. The polishing paper transfer robot 34 is movable in the X-direction. Also, the polishing paper transfer robot 34 holds a polishing paper chuck mechanism 36. The polishing paper chuck mechanism 36 is movable in the Y-direction on an arm of the polishing paper transfer robot 34, and a chuck portion at a leading end thereof is movable in the Z-direction.

On the other hand, below the optical cable supporting unit 10, two rotation/swing mechanisms 40A, 40B are disposed. The polishing paper transfer robot 34 and the polishing paper chuck mechanism 36 are adapted to enable automatic replacement of the polishing paper 32 by chucking an arbitrary polishing paper 32 from the polishing paper setting unit 30, and transferring it to the rotation/swing mechanism 40A, 40B for setting therein.

Next, using FIG. 2, the ferrule positioning/holding unit 100 for use in the apparatus for polishing an end-surface of a ferrule according to this embodiment will be described for its detailed configuration.

Figure 2:
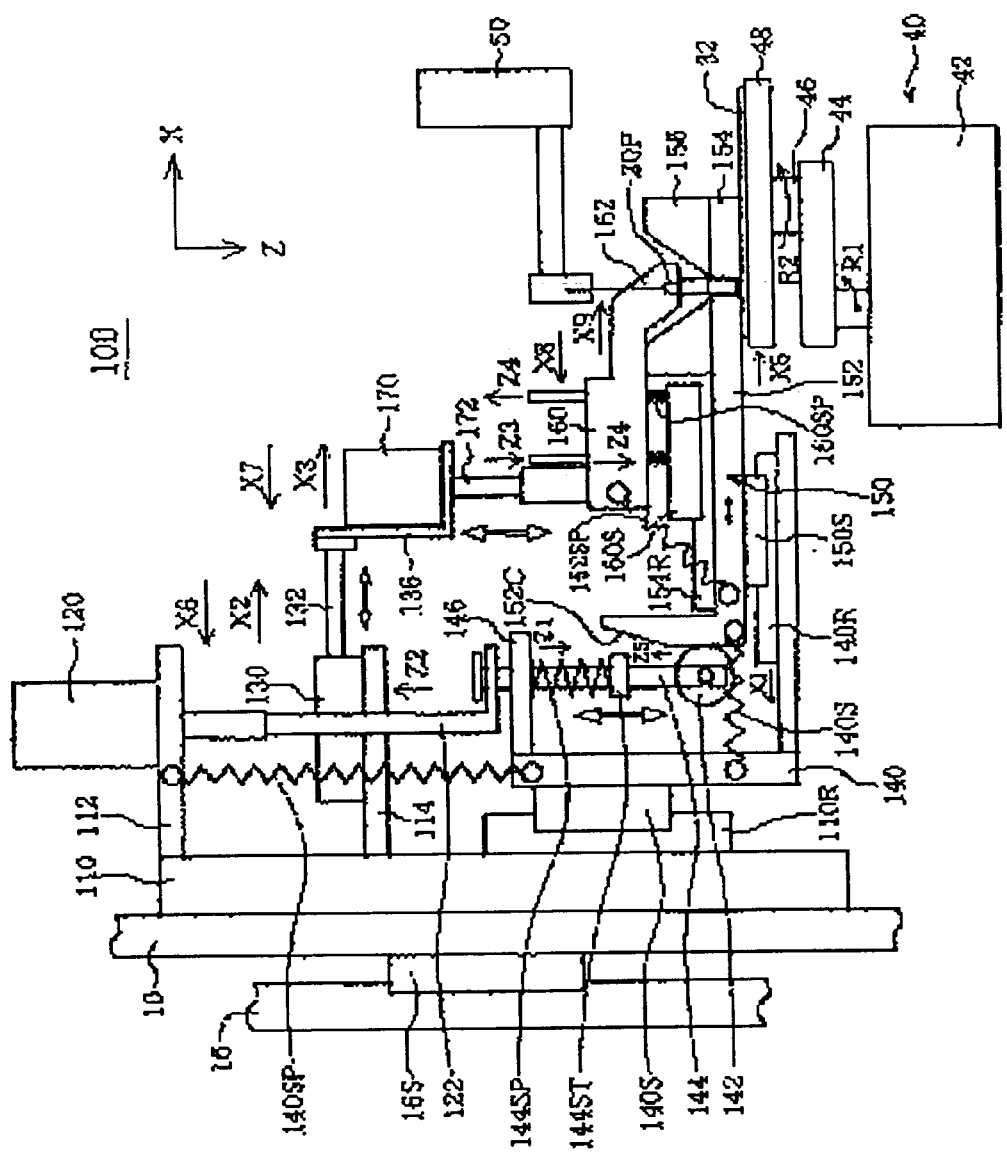
FIG. 2 is a side view illustrating the detailed configuration of a ferrule holder of the present invention.

FIG. 2 is a side view illustrating the detailed configuration of the ferrule positioning/holding unit for use in the apparatus for polishing an end-surface of a ferrule according to one embodiment of the present invention. As explained in FIG. 1, the apparatus for polishing an end-surface of a ferrule according to this embodiment comprises the four ferrule positioning/holding units 100A, 100B, 100C, 100D which are all identical in configuration, so that their detailed configuration will be explained herein as the ferrule positioning/holding unit 100. The same reference numerals as those in FIG. 1 designate the same parts.

The optical cable supporting unit 10 is movable in the vertical direction (Z-direction) along a slider 16S of the unit elevating mechanism 16. A frame 110 is fixed on the optical cable supporting unit 10. On the frame 110, a releasing cylinder 120 is attached through a supporting base 112, and a block extruding cylinder 130 is attached through a supporting base 114. Also, a slider 140S of a Z-moving mechanism 140 is in engagement with a rail 110R of the frame 110. The Z-moving mechanism 140 is reciprocally movable in the Z-direction with respect to the frame 110. A spring 140SP is attached between the supporting base 112 of the frame 110 and the Z-moving mechanism 140, and the Z-moving mechanism 140 is suspended by the spring 140SP.

A guide holding mechanism 150 is attached to the Z-moving mechanism 140. The guide holding mechanism 150 is comprised of two holder blocks 152, 154 and a guide block 156. The detailed configuration of the holder blocks 152, 154 will be described later using FIGS. 3 and 4. The holder block 152 is attached to the rail 140R of the Z-moving mechanism 140 through a slider 150S, and reciprocally movable in the X-direction. The holder block 152 and the guide block 156 are fixed to the Z-moving mechanism 140. At a left-hand end of the holder block 152, a cam surface 152C is formed. A cam follower 142 is in engagement with the cam surface 152C. A spring 140S is tied between the Z-moving mechanism 140 and the guide block 152 for urging the guide block 150 in a direction of an arrow X1 to hold the engagement of the cam surface 152C with the cam follower 142. As the cam follower 142 moves in the Z-direction, the cam follower 142 moves along the cam surface 152C, and the guide block 152 moves in the X-direction. The cam follower 142 is attached at a leading end of a cam follower shaft 144. The cam follower shaft 144 is held slidable on a supporting base 146 of the Z-moving mechanism 140. A stopper 144ST is disposed in the middle of the com follower shaft 144. A spring 144SP is inserted between the supporting base 146 of the Z-moving mechanism 140 and the stopper 144ST of the cam follower shaft 144 to urge the cam follower shaft 144 in a direction of an arrow Z1. The cam follower shaft 144 is in engagement with a shaft 122 of the releasing cylinder 120. As the releasing cylinder 120 operates, the shaft 122 moves in a direction of an arrow Z2. Together with this, the com follower shaft 144 also moves in the same direction. As a result, the cam follower 142 is in engagement with the cam surface 152C, so that the guide block 152 moves in the direction of the arrow X1.

A provisionally retaining block 160 is supported on the rail 154R of the guide block 154 through a slider 160S and a spring 160SP. At a leading end of the provisionally retaining block 160, a retainer 162 is supported for retaining a flange of a ferrule 20F. Also, a spring 152SP is suspended between the provisionally retaining block 160 and a holder block 152. On the other hand, a shaft 132 of the block extruding cylinder 130 is in engagement with a frame 136 for holding a block retaining cylinder 170. The shaft 172 of the block retaining cylinder 170 is in engagement with the provisionally retaining block 160. The shaft 172 of the block retaining cylinder 170 is reciprocally movable in the Z-direction. As the shaft 172 of the block retaining cylinder 170 moves in a direction of an arrow Z3, the leading end of the shaft 172 presses the provisionally retaining block 160 in a direction of an arrow Z4 against a spring force of the spring 160SP. Also, the shaft 132 of the block extruding cylinder 130 is reciprocally movable in the X-direction. As the shaft 132 of the block extruding cylinder 130 moves in the direction of the arrow X2, the frame 136 moves in a direction of an arrow X3, and further extrudes the provisionally retaining block 160 in a direction of an arrow X4 against a spring force of the spring 152SP.

Below the guide holder mechanism 150 of the ferrule positioning/holding unit 100, a rotation/swing mechanism 40 is disposed. The rotation/swing mechanism 40 is comprised of a driving source 42, a swing arm 44, a rotating shaft 46, and a turntable 48. The driving source 42 swings the swing arm 44 in a direction of an arrow R1, and rotates the rotating shaft attached to an end of the swing arm 42 in a direction of an arrow R2. A sheet of polishing paper 32 is held on the turntable 48 which is rotated by the rotating shaft 46.

Also, above the guide block 156 of the guide holding mechanism 150 of the ferrule positioning/holding unit 100, a cable chuck robot 50 is disposed. The cable chuck robot 50 holds an optical fiber having a ferrule 20F attached at a leading end thereof, and moves the ferrule 20F to the guide block 156.

Next, the detailed configuration of the guide holding member 150 for use in the apparatus for polishing an end-surface of a ferrule according to this embodiment, will be described using FIGS. 3 and 4.

Figure 3:
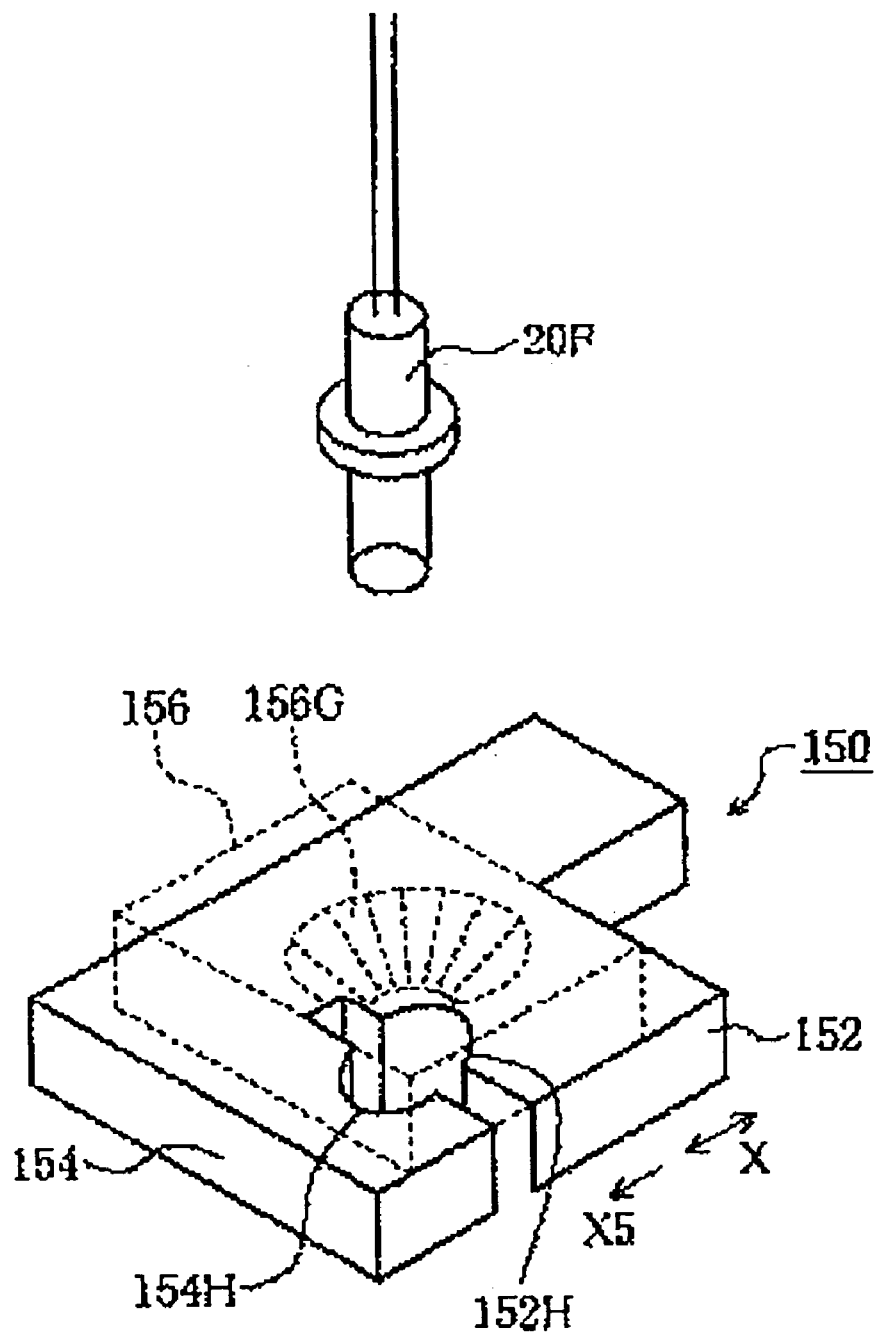
FIG. 3 is a perspective view of a guide holding mechanism of the present invention.

FIG. 3 is a perspective view of the guide holding member 150 for use in the apparatus for polishing an end-surface of a ferrule according to one embodiment of the present invention. The guide block 156 is shown by broken lines for clarifying the shapes of the underlying holder blocks 152, 154. Also, FIG. 4 is a plan view of the guide holding member 150 for use in the apparatus for polishing an end-surface of a ferrule according to one embodiment of the present invention.

Figure 4:
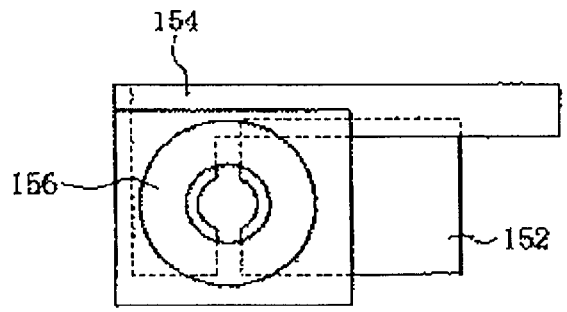
FIG. 4 is a plan view of the guide holding mechanism 150 of the present invention.

As illustrated in FIGS. 3 and 4, the guide holding mechanism 150 is comprised of two holder blocks 152, 154 and a guide block 156. The guide block 156 comprises a cone-shaped guiding portion 156G. A diverging end of the guide portion 156G is open to the upper side of the guide block 156. A tapered end of the guiding portion 156G is open to the lower side of the guide block 156. The diameter of the opening at the tapered end is larger than the outer diameter of a cylinder portion at a lower end of the ferrule 20F by approximately 0.5 mm. The holder blocks 152, 154 have semi-cylindrical holders 152H, 154H at their opposing portions, respectively. The holders 152H, 154H have dimensions and shapes suitable for holding the cylinder portion at the lower end of the ferrule 20F when they are joined together.

As explained in FIG. 2, the holder block 152 and the guide block 156 are fixed on the Z-moving mechanism. The holder block 152 is reciprocally movable in the X-direction. The X-direction, herein referred to, is the same direction as the X-direction in FIG. 2.

As illustrated in FIGS. 3 and 4, the holder block 152 and the holder block 154 are separated from each other before they hold the ferrule 20F. In this state, the ferrule 20F held by the cable chuck robot 50 is transferred. As the ferrule 20F is brought downward vertically by the cable chuck robot 50, the lower end of the ferrule comes in contact with the guiding portion 156G of the guide block 156, and positioned between the holders 152H, 154H of the guide blocks 152, 154, guided by the cone-shaped guiding portion 156G. Subsequently, as the holder block 152 moves in the direction of the arrow X4, the ferrule 20F can be held.

Next, the operation of the ferrule positioning/holding unit 100 for use in the apparatus for polishing an end-surface of a ferrule according to this embodiment will be explained using FIGS. 2, 5 and 6.

Figure 5:
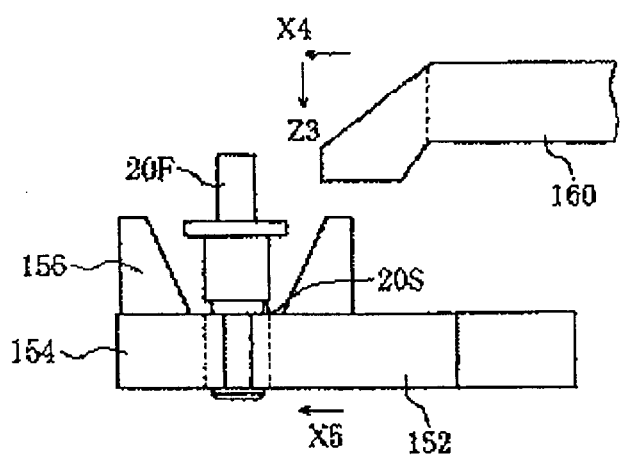
FIG. 5 is a side view for explaining the operation of the guide holding mechanism 150 of the present invention.
Figure 6:
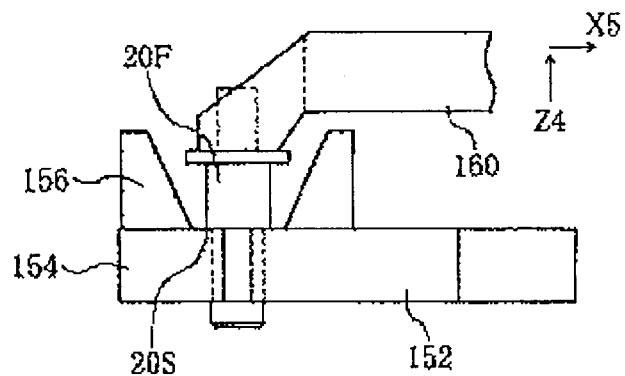
FIG. 6 is a side view for explaining the operation of the guide holding mechanism 150 of the present invention.

FIGS. 5 and 6 are side views for explaining the operation of the guide holding mechanism 150 for use in the apparatus for polishing an end-surface of a ferrule according to one embodiment of the present invention.

In the following explanation, as illustrated in FIG. 2, explanation will be given of steps of removing the ferrule 20F held by the holder blocks 152, 154, and holding a new ferrule by the holder blocks 152, 154.

As the block extruding cylinder 130 operates from the state illustrated in FIG. 2 to move the shaft 132 in a direction of an arrow X6, the block retaining cylinder 170 and the shaft 172 move in the direction of the arrow X2. Since the spring 152SP is suspended between the holder block 152 and the provisionally retaining block 160, the provisionally retaining block 160 is moved in a direction of an arrow X8 by a spring force of the spring 152SP. Next, as the block retaining cylinder 170 operates to move the shaft 172 in the direction of the arrow Z4, the compressed spring 160SP interposed between the provisionally retaining block 160 and the slider 160S causes the provisionally retaining block 160 to move in the direction of the arrow Z4 with a spring force of the spring 160SP. In other words, the provisionally retaining block 160 transitions from the state illustrated in FIG. 6 to the state illustrated in FIG. 5.

In this state, the ferrule 20F is held between the holder block 152 and the holder block 154, i.e., in a state in which the ferrule 20F is polished by the polishing paper 32. As described above, the Z-moving mechanism 140 is suspended down by the spring 140SP with respect to the supporting base 112, and the leading end of the ferrule 20F is pressed onto the polishing paper 32 at a constant pressure expressed by ((Spring Force of Spring 140SP)—(Own weights of Z-Moving Mechanism 140 and Guide Holding Mechanism 150)).

As the end-surface at the leading end of the ferrule 20F has been polished, the releasing cylinder 120 operates to move the shaft 122 in the direction of the arrow Z2. Responsively, the cam follower shaft 144 and the cam follower 142 move in the direction of the arrow Z5. Since the cam follower 142 follows the cam surface 152C, the holder block 152 moves in the direction of the arrow X5. As a result, as illustrated in FIG. 3, the holder block 152 and the holder block 154 move away from each other, so that the ferrule 20F is released from the holding by the holder 152H and the holder 154H, and is movable by the cable chuck robot 50.

Next, when a new ferrule is positioned above 20F by the cable chuck robot 50, and the new ferrule is brought downward, its leading end is positioned between the holder 152H and the holder 154H as guided by the guiding portion 156G of 156. Next, as the releasing cylinder 120 operates to move the shaft 122 in the direction of the arrow Z1, the come follower 142 moves in the Z1 direction, while in contact with the cam surface 152C, causing the holder block 152 to move in the direction of the arrow X5 to hold the new ferrule between the holder 152H and the holder 154H. FIG. 5 illustrates this state.

Next, as the block extruding cylinder 130 operates to move the shaft 132 in the direction of the arrow X2, the block retaining cylinder 170 and the shaft 172 move in the direction of the arrow X3. While the spring 152SP is suspended between the holder block 152 and the provisionally retaining block 160, the provisionally retaining block 160 moves in the direction of the arrow X4 against the spring force of the spring 152SP. Further, as the block retaining cylinder 170 operates to move the shaft 172 in the direction of the arrow Z3, the provisionally retaining block 160 moves in the direction of the arrow Z3 against the spring force of the spring 160SP, although the compressed spring 160SP is interposed between the provisionally retaining block 160 and the slider 160S. In this event, 162 at the leading end of the provisionally retaining block 160 pushes a flange of the new ferrule, causing a stepped portion 20S of the new ferrule to run into the top surfaces of the holder blocks 152, 154, as illustrated in FIG. 6, thus making it possible to position the ferrule in the Z-direction.

As the holding of the ferrule is complete, the block extruding cylinder 130 operates to move the shaft 132 in the direction of the arrow X6, causing the block retaining cylinder 170 and the shaft 172 to move in a direction of an arrow X7. Since the spring 152SP is suspended between the holder block 152 and the provisionally retaining block 160, the provisionally retaining block 160 moves in a direction of an arrow X8 with a spring force of the spring 152SP. Next, as the block retaining cylinder 170 operates to move the shaft 172 in the direction of the arrow Z4, the compressed spring 160SP interposed between the provisionally retaining block 160 and the slider 160S forces the provisionally retaining block 160 to move in the direction of the arrow Z4 with a spring force of the spring 160SP. In other words, the provisionally retaining block 160 transitions from the state illustrated in FIG. 6 to the state illustrated in FIG. 5, thereby permitting a new ferrule to be polished.

Next, the structure for holding polishing paper for use in the ferrule end-surface polishing apparatus according to this embodiment will be described using FIGS. 7 and 8.

Figure 7:
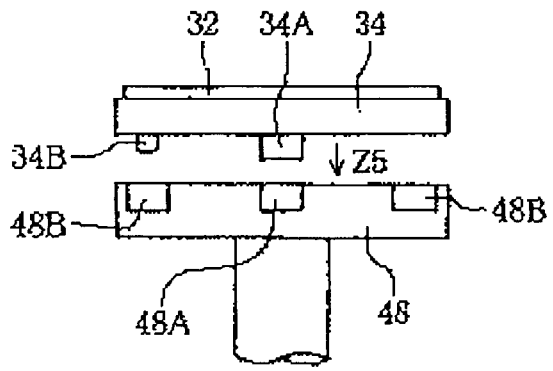
FIG. 7 is a side view illustrating a mechanism for holding polishing paper of the present invention.
Figure 8A:
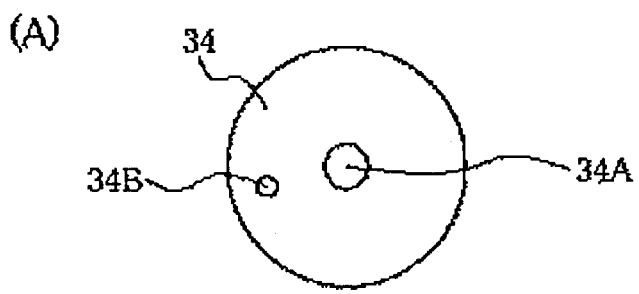
FIG. 8A is a bottom view of a metal plate for holding the polishing paper of the present invention.
Figure 8B:
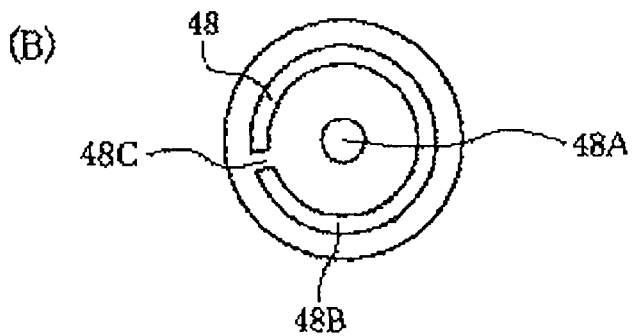
FIG. 8B is a plan view of a turntable of the present invention.

FIG. 7 is a side view illustrating the structure for holding polishing paper for use in the ferrule end-surface polishing apparatus according to one embodiment of the present invention; FIG. 8A is a bottom view of a metal plate for holding the polishing paper for use in the ferrule end-surface polishing apparatus according to one embodiment of the present invention; and FIG. 8B is a plan view of a turntable for use in the ferrule end-surface polishing apparatus according to one embodiment of the present invention.

As illustrated in FIG. 7, the polishing paper 32 is securely held on the metal plate 34 by a double-faced tape or the like. The metal plate 34 and the polishing paper 32 held by the polishing paper chuck mechanism 36 illustrated in FIG. 1 is transferred to a position above the turntable 48. Subsequently, the metal plate 34 and the polishing paper 32 are moved down in the direction of the arrow Z5, and placed on the turntable 48.

Here, as illustrated in FIG. 8A, a positioning convex pin 34A is provided in a central lower portion of the metal plate 34, and a fixing convex pin 34B is provided in a peripheral end portion of the metal plate 34. On the other hand, as illustrated in FIG. 8B, a positioning hole 48A is formed in a central upper portion of the turntable 34. Also, a groove 48B is formed in a circumferential portion of the turntable 48. The groove 48B is not in a closed loop, and is provided with a stopper 48C.

Thus, as the metal plate 34 and the polishing paper 32 are moved down in the direction of the arrow Z5 and placed on the turntable 48, the positioning pin 34A engages with the positioning hole 48A, so that the metal plate 34 is positioned with respect to the turntable 48. Also, the fixing convex pin 34B engages with the groove 48B and stopped by the stopper 48C, thereby fixing the metal plate 34 with respect to the turntable 48.

Next, the general operation of the ferrule end-surface polishing apparatus according to this embodiment will be described using FIGS. 1 and 2.

First, sheets of polishing paper 32 selected in accordance with polishing conditions are placed at predetermined positions of the polishing paper setting unit 30, the optical cable 20 wound around the bobbin 22 is set on the bobbin holder 12, and the optical cable 20 on the optical cable holder 14 by an optical cable transfer robot or a manual operation, and the operation is started by a starting switch or the like. The ferrule positioning/holding mechanism 100 positions and holds the ferrule 20F. Next, from sheets of the polishing paper 32 in the polishing paper setting unit 30 previously set in accordance with the polishing conditions, predetermined polishing paper 32 is chucked by a movement of the polishing paper transfer robot 34 and the polishing paper chucking mechanism 36, and set on the turntable 48 of the rotation/swing mechanism 40 located below the ferrule positioning/holding mechanism 100.

Next, the ferrule positioning/holding mechanism 100 is moved down to press the ferrule 20F with a fixed pressure, while the rotation/swing mechanism 40 operates to rotate as well as swing the turntable 48. Following this, the plate 34, on which the polishing paper 32 is adhered, is rotated and swung to polish for a predetermined time period. As the polishing is completed, the ferrule positioning/holding mechanism 100 is moved up, another polishing paper 32 is substituted by the polishing paper transfer robot 34 and the polishing paper chucking mechanism 36, and the polishing is gain performed through the foregoing steps to complete a sequence of operations.

When an end portion of a ferrule is polished using two types of rough and fine polishing paper, the polishing is performed, for example, for two minutes by the rough polishing paper, and next, the polishing is performed for two minutes by the fine polishing paper. Both the rough polishing paper and the fine polishing paper are replaced with new sheets of polishing paper after ferrules are polished six times.

As described above, in this embodiment, a ferrule is guided by the guide blocks between the holder blocks, and the ferrule is held by the holder units formed on each of the two holder blocks, so that the ferrule can be automatically held.

Also, a holding/guiding mechanism such as the holder blocks is suspended by a spring such that the ferrule is pressed onto the polishing paper to polish the end-surface of the ferrule by a differential pressure between a spring force of this spring and the own weight of the holding/guiding mechanism, the holding/guiding mechanism is a structure completely separated from a power source in a polishing state, thereby making it possible to set a fine pressure to be applied, stabilize polishing conditions, and achieve polishing of good quality.

Further, the polishing paper can be automatically replaced by means of the polishing paper transfer robot and the polishing paper chucking mechanism.

According to the present invention, the ferrule end-surface polishing apparatus can be readily automated.

What is claimed is:

1. A ferrule end-surface polishing apparatus comprising:
   ferrule holding means having a holder block capable of sandwiching a cylindrical portion of a ferrule, and a guide block for guiding the ferrule to the holder block, wherein said holder block has two sandwiching portions for sandwiching the cylindrical portion of the ferrule with opposing portions thereof, at least one of said sandwiching portions being movable in an opposing direction, and wherein said sandwiching portions sandwich the ferrule when the ferrule is held, and said sandwiching portions release the ferrule when the ferrule is loaded or removed;
   polishing means having a rotatable polishing board for polishing an axial end-surface of the ferrule held by said ferrule holding means; and
   ferrule transfer means for transferring and loading the ferrule into said ferrule holding means, and for removing the ferrule therefrom after polishing.

2. A ferrule end-surface polishing apparatus according to claim 1, wherein:
   said sandwiching portions of said holder block have an arcuate cross section.

3. A ferrule end-surface polishing apparatus according to claim 1, wherein:
   said guide block has a guide hole positioned on a ferrule inserting side of said holder block, wherein the ferrule is guided to said guide hole, and loaded into said holder block.

4. A ferrule end-surface polishing apparatus according to claim 3 wherein:
   said guide hole has a shape of a cone which is open to the ferrule inserting side.

5. A ferrule end-surface polishing apparatus according to claim 1, comprising:
   urging means for pressing the axial end-surface of the ferrule held by said ferrule holding means onto said polishing means with a fixed pressure.

6. A ferrule end-surface polishing apparatus according to claim 5, wherein said urging means has a spring for suspending said ferrule holding means in a vertical direction, and the axial end-surface of the ferrule is pressed onto said polishing means by a differential pressure between a spring force of said spring and weight of said ferrule holding means.

7. A ferrule end-surface polishing apparatus according to claim 1, wherein:
   said ferrule transfer means transfers the ferrule to said ferrule holding means, and subsequently loads the ferrule in a vertical direction; and
   said ferrule holding means sandwiches the cylindrical portion of the ferrule in the vertical direction, and presses a vertically axial end-surface onto said polishing means when the ferrule is polished.

8. A ferrule end-surface polishing apparatus comprising:
   ferrule holding means having a holder block capable of sandwiching a cylindrical portion of a ferrule, and a guide block for guiding the ferrule to the holder block;
   polishing means having a polishing board for polishing an axial end-surface of the ferrule held by said ferrule holding means, and a turntable for holding said polishing board, wherein said polishing board comprises a rotation positioning pin in a central portion and a fixing pin in a circumferential end portion; and said turntable comprises a rotation positioning hole in a central portion corresponding to said rotation positioning pin, and a groove corresponding to said fixing pin and a stopper in a circumferential end portion; and polishing paper transfer means for transferring the polishing board to and setting on said turntable.

9. A ferrule end-surface polishing apparatus according to claim 8, wherein said polishing paper transfer means transfers said polishing board to said turntable, and subsequently mounts said polishing board in a vertical direction, and said turntable chucks said polishing board by means of said rotation positioning pin and said rotation positioning hole, and said fixing pin and said groove corresponding to said fixing pin.

10. A ferrule end-surface polishing apparatus comprising:

ferrule holding means having a holder block capable of sandwiching a cylindrical portion of a ferrule, and a guide block for guiding the ferrule to the holder block;

polishing means having a polishing board for polishing an axial end-surface of a ferrule held by said ferrule holding means, and a turntable for holding said polishing board; and polishing paper transfer means for transferring the polishing board to and setting on said turntable, wherein said polishing paper transfer means transfers said polishing board to said turntable, and subsequently mounts said polishing board in a vertical direction, and said turntable chucks said polishing board by means of a rotation positioning pin in a central portion of said polishing board and a hole in a central portion of said turntable corresponding to said rotation positioning pin, and a fixing pin in a circumferential end portion of said polishing board and a groove corresponding to said fixing pin.

* * * * *